United States Patent
Kierstead

(10) Patent No.: US 9,643,763 B2
(45) Date of Patent: May 9, 2017

(54) REUSABLE CABLE TIE

(71) Applicant: Richard Martin Kierstead, Vancouver (CA)

(72) Inventor: Richard Martin Kierstead, Vancouver (CA)

( * ) Notice: Subject to any disclaimer, the term of this patent is extended or adjusted under 35 U.S.C. 154(b) by 0 days.

(21) Appl. No.: 14/392,411

(22) PCT Filed: Dec. 12, 2014

(86) PCT No.: PCT/CA2014/000889
§ 371 (c)(1),
(2) Date: Jun. 10, 2016

(87) PCT Pub. No.: WO2015/089630
PCT Pub. Date: Jun. 25, 2015

(65) Prior Publication Data
US 2016/0325897 A1    Nov. 10, 2016

(30) Foreign Application Priority Data
Dec. 16, 2013   (CA) ...................................... 2837458

(51) Int. Cl.
*B65D 63/10*  (2006.01)
*H02G 3/30*  (2006.01)
*F16L 3/233*  (2006.01)
*F16B 2/08*  (2006.01)

(52) U.S. Cl.
CPC .......... *B65D 63/1027* (2013.01); *H02G 3/30* (2013.01); *B65D 2563/103* (2013.01); *B65D 2563/107* (2013.01); *F16B 2/08* (2013.01); *F16L 3/2336* (2013.01); *Y02W 30/807* (2015.05); *Y10T 24/141* (2015.01); *Y10T 24/1498* (2015.01)

(58) Field of Classification Search
CPC ................ B65D 63/1027; B65D 63/14; B65D 2563/103; B65D 2563/107; B65D 63/16; Y10T 24/141; Y10T 24/1498; Y10T 24/1422; F16L 3/233; F16L 3/2336
See application file for complete search history.

(56) References Cited

U.S. PATENT DOCUMENTS

| | | | | |
|---|---|---|---|---|
| 3,197,829 A | * | 8/1965 | Caveney | ............... B65D 63/10 174/40 CC |
| 4,557,023 A | * | 12/1985 | Six | .................... B65D 63/1072 24/16 PB |
| 5,208,952 A | * | 5/1993 | Mintel | ................... A43C 11/00 24/584.1 |

(Continued)

*Primary Examiner* — Robert J Sandy
*Assistant Examiner* — Michael Lee

(57) ABSTRACT

A reusable cable tie comprises an elongated strap, made of semi-rigid plastic material, and a buckle, made of rigid plastic material, for interlocking with the elongated strap. The elongated strap includes a first end a second end, an inner side and an outer side. The inner side incorporates a rack with a multiplicity of teeth, alternating with a multiplicity of grooves. The multiplicity of teeth extends from the first end up to a flat indented zone adjoining the second end that is provided with several teeth and grooves, the several teeth projecting from the outer side in an external zone corresponding to a beginning of the flat indented zone. The buckle incorporates a cavity so shaped and sized as to allow a passage through of the first and the second end of the elongated strap.

1 Claim, 9 Drawing Sheets

(56) References Cited

U.S. PATENT DOCUMENTS

| | | | | |
|---|---|---|---|---|
| 5,386,615 A * | 2/1995 | Bernard | ............... | B65D 63/14 24/16 PB |
| 6,533,226 B2 * | 3/2003 | Geiger | ............... | F16L 3/237 248/68.1 |
| 2010/0306967 A1 * | 12/2010 | Geiger | ............... | B65D 63/14 24/16 PB |

* cited by examiner

REUSABLE CABLE TIE

I. BACKGROUND OF THE INVENTION

1. Field of the Invention

The present invention relates, in general, to cable ties and, in particular, to a reusable cable tie.

2. Description of the Prior Art

Cable ties are widely used for wrapping their straps around objects, then tightening them and, finally, securing them. The known cable ties, once secured around objects, cannot be turn loose or reused. The remove them, the only solution is to use cutting means.

Several attempts to remediate the foregoing situation have been made. For example, U.S. Pat. No. 8,516,660, dated Aug. 27, 2013 and granted to Ku for a "Cable Tie". This patent discloses a cable tie including a slot base with an insertion hole, a belt and at least one fastener. At least one surface of the insertion hole is slanted. A plurality of locking teeth is arranged at a surface on one side of the belt. The fastener is mounted into the insertion hole of the slot base correspondingly. The fastener includes a slanted surface arranged to correspond to the slanted surface of the slot base, and a plurality of projecting teeth corresponding to the locking teeth of the belt. The projecting teeth are arranged on a surface of the fastener.

The slot base further includes a locking slot part and a releasing slot part adjacent to each other, while the faster is disposed with a clamping part. When the clamping part of the fastener is locked with the releasing slot part, the fastener is on large hole end of the insertion hole of the slot base.

The main disadvantages of the foregoing cable tie reside in the fact that its components are structurally complicated and, consequently, their manufacture costs are increased and their reliability is limited.

Another example is U.S. Pat. No. 8,474,113, dated Jul. 2, 2013 and granted to Badrenas Buscart for a "Buckle Assembly". This patent discloses a main housing incorporating first and second lateral walls and a top wall integrally formed with the first and second lateral walls. A strap passage is formed through the main housing and a button passage is formed through the first lateral wall. A button is received in said main housing through the button passage and a spring is configured to exert equal and opposite forces into the bottom and the main housing, a movement of the button being configured to be directly transferred to the spring and vice-versa. A ratchet strap is positioned within the strap passage. The ratchet strap is movable through the strap passage in a first direction, and when the button is pressed, the ratchet strap is moveable through the main housing in a second direction, opposite to the first direction. The button further comprises a first ledge, while the main housing further comprises a second ledge, the button being being prevented from ejecting out of the main housing by the first ledge abutting the second ledge. The top wall of the housing includes a recess connected with the button passage, the recess exposing a top portion of the button when the button is recessed. A closed end of the recess is configured to define a stop for a finger operating the button during use.

The essential shortcomings of this invention are: a relative high number of parts; cumbersome and reduced convenience in use.

Yet another example is U.S. Pat. No. 8,146,211, dated Apr. 3, 2012 and granted to Shirai et al. for a "Slide Adjuster for Belt and Buckle". The invention describes a belt having engagement grooves in a form of saw teeth at one side thereof and a buckle for receiving the belt therein in a forward direction and preventing the belt in the buckle from moving in a backward direction.

The buckle comprises: a buckle body having a bottom plate, a ceiling frame formed above the bottom plate, and two side plates for connecting the bottom plate and the ceiling frame to form an internal space for insertion of the belt therein. The buckle further comprises an operating plate disposed above the bottom plate adjacent the ceiling frame, and includes an engagement claw projecting toward the bottom plate from a bottom surface at one lateral end portion thereof to engage one of the engagement grooves of the belt, a pressing section is provided at a side opposite to the one end portion, and a connecting shaft is provided for connecting the operating plate between the two side plates at an intermediate point between the engagement claw and the pressed section to swing around the intermediate point as a fulcrum. The buckle body further includes restricting members projecting inwardly from the two side plates. Operating plate includes recessed portions for receiving the restricting members therein without connecting thereto to prevent an accidental pressing force from being applied in a vertical direction to the operating plate.

Among the main disadvantages of the foregoing patent one can enumerate the following: the relative structural and operational complexity of the assembly; some parts of the assembly have reduced strength and rigidity which impact their service life.

II. SUMMARY OF THE INVENTION

To overcome the drawbacks of the above cited patents, one can conclude that there is a need for an improved reusable cable tie.

Thus, a first objective of the present invention is to develop sufficiently strong and wear-resistant components with the minimum possible dimensions and weight.

A second objective of the present invention is to develop a cable tie with a buckle which should not fail or have residual deformations under the effect of the forces that act on it.

A third objective of the present invention is the production soundness, i.e. the shape and material of the two components should be so selected that their production requires the minimum expenditures of tools for plastic molding, labour and time.

Broadly stating, the present invention comprises an elongated strap, made of semi-rigid plastic material, and a buckle, made of rigid plastic material, for interlocking with the elongated strap. The elongated strap comprises a first end a second end, an inner side and an outer side, the inner side comprising a rack having a multiplicity of teeth, equally spaced and transversely located with respect to the direction of the elongated strap. Each of said multiplicity of teeth has in cross-section a triangular shape, the multiplicity of teeth alternates with a multiplicity of grooves, equally spaced. Each of the multiplicity of grooves has a shape and a size corresponding to each of the multiplicity of teeth, the multiplicity of teeth extending from the first end up to a flat indented zone, adjoining the second end. The second end has several teeth, alternating with several grooves, the several teeth being compatible to penetrate and intermesh with corresponding grooves of the multiplicity of grooves. The several teeth project from the outer side in an external zone, corresponding to a beginning of the flat indented zone.

The buckle has a shape of a rectangular parallelepiped which incorporates a cavity delimited by top, bottom and lateral sides, an entrance and exit being open to the exterior.

The cavity is so shaped and sized as to allow a passage through of the first and the second end of the elongated strap, while superposed; and in order first to wrap and, then, to tighten the elongated strap around an object, the buckle is retained in the flat indented zone, at a lower part of the cavity, with its several teeth projecting upwardly. After the tightening is achieved, the first end of the elongated strap is inserted through the cavity, above the second end and, finally, the buckle is displaced so the several teeth penetrate corresponding grooves of the multiplicity of grooves.

In one embodiment of the present invention, the triangular shape is defined by an isosceles triangle, and the one end of the elongated strap, which incorporates the flat indented zone, is provided with:

an internal wedge located between the flat indented zone and an end of the multiplicity of teeth, the internal wedge being tapered to a thin edge towards the multiplicity of teeth; and an external wedge located at an external extremity of the flat indented zone, its thick edge being, In another embodiment of the present invention, the elongated strap is provided laterally, at each side of the multiplicity of teeth and the multiplicity of grooves, starting from their bottoms, with an ascending slanted zone, followed by an externally directed descending slanted zone, and terminating into a straight zone. The flat indented zone includes a short, slightly widened portion preceded by a first retaining portion starting from the internal edge. The first retaining portion, lengthwise, has such a size that enables the buckle to be lodged there, when the reusable cable tie is in a final closed position. A second retaining portion succeeds the short, slightly widened portion extending up to the external edge. The second retaining portion, lengthwise, has such a size that enables the buckle to be lodged there during a wrapping of the elongated strap around an object. The short, slightly widened portion, being wider than the first retaining portion and the second retaining portion keeps the buckle in place either in the first retaining portion or in the second retaining portion, no hand being necessary therefor. To move the buckle from the first retaining portion to the second retaining portion or vice verso, a slight manual effort to move the buckle along the short, slightly widened portion is needed. The ridge engaging tooth is provided with intersecting sides for contacting the descending slanted zones, so that the buckle enables a easy passage of the elongated strap.

III. BRIEF DESCRIPTION OF THE DRAWINGS

The subject matter of the invention is particularly pointed out and distinctively claimed in the concluding portion of the specification. The invention, however, both in structure and operation may be better understood by reference to the following description taken in conjunction with the subjoined claims and the accompanying drawings of which FIG. 1 illustrates a diagrammatic lateral view of a reusable cable tie, before use;

IV. DESCRIPTION OF THE PREFERRED EMBODIMENT

Figure 1:
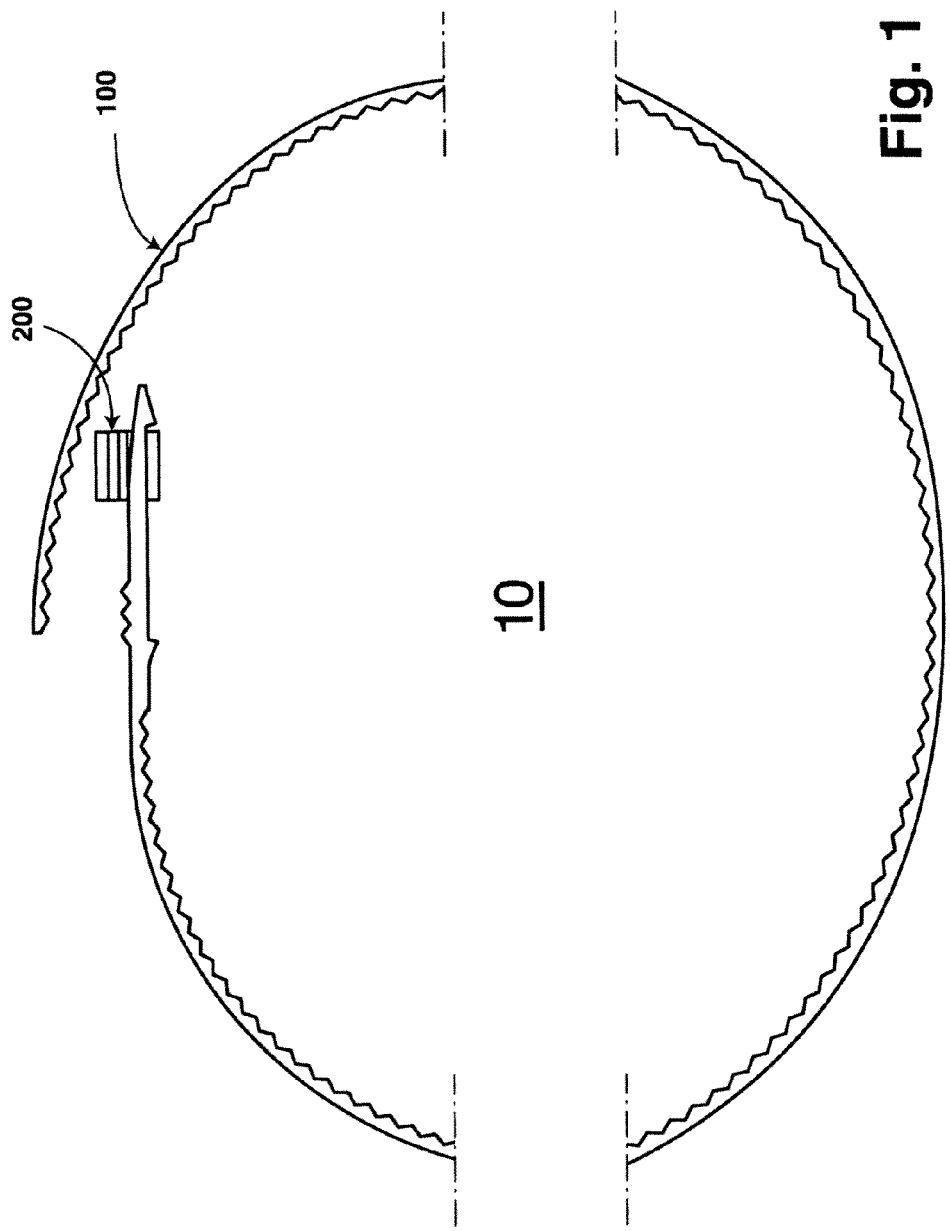
Figure 2:
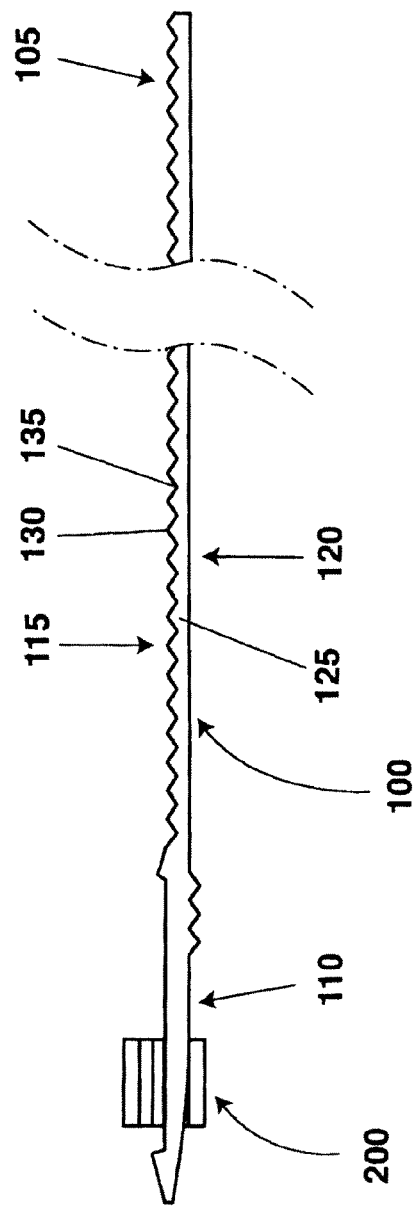
FIG. 2 illustrates a diagrammatic lateral view of a reusable cable tie, in a flat position.
Figure 3:
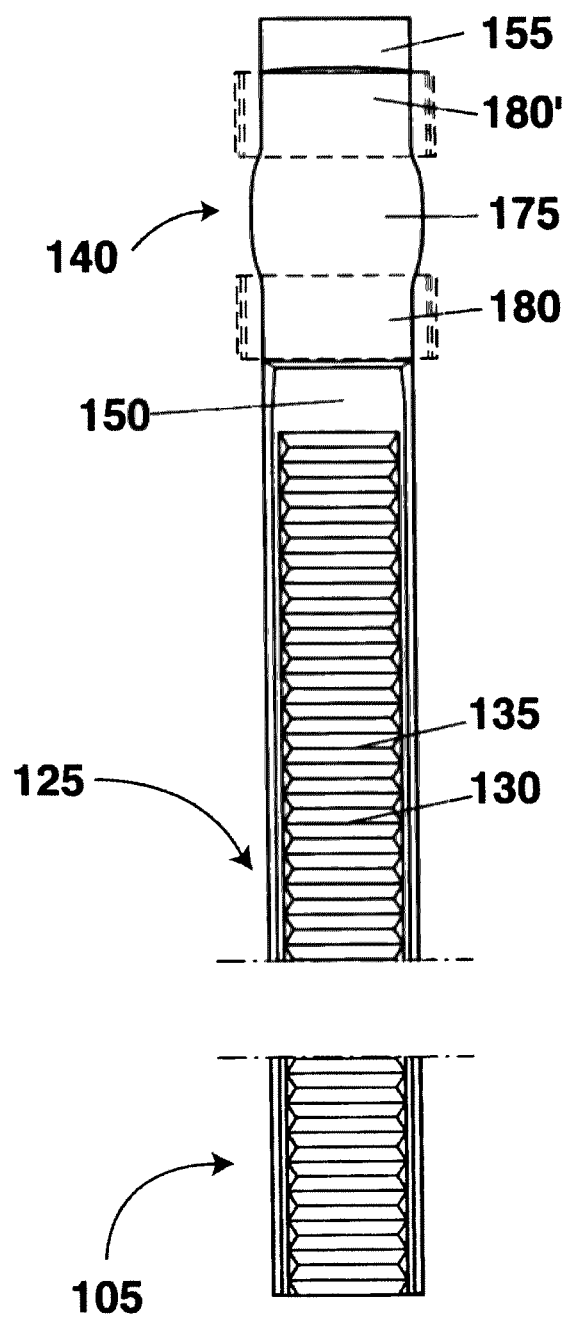
FIG. 3 illustrates a diagrammatic inner side view of a reusable cable tie, in a flat position.
Figure 4:
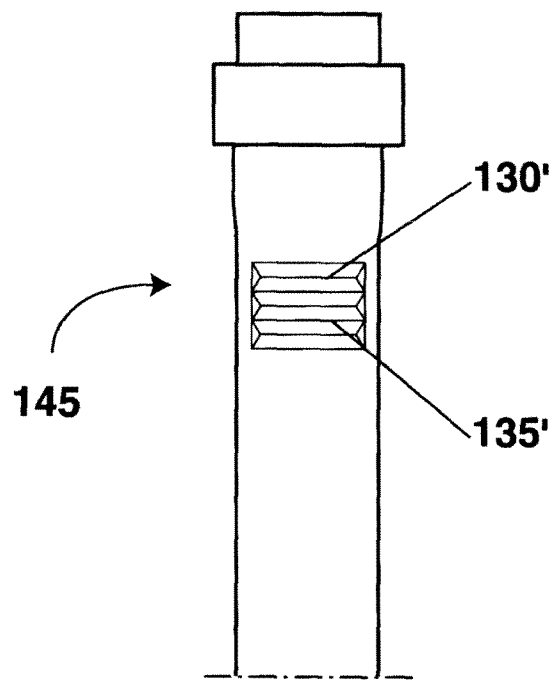
FIG. 4 illustrates a diagrammatic outer side view of a reusable cable tie, in a flat position.
Figure 5:
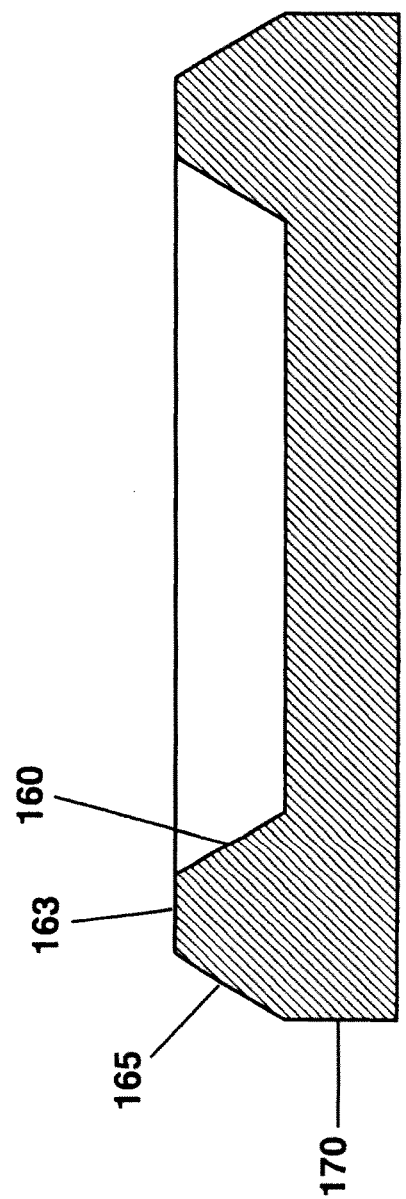
FIG. 5 illustrates a vertical cross-section throughout one tooth of the multiplicity of teeth of the elongate strap.
Figure 6:
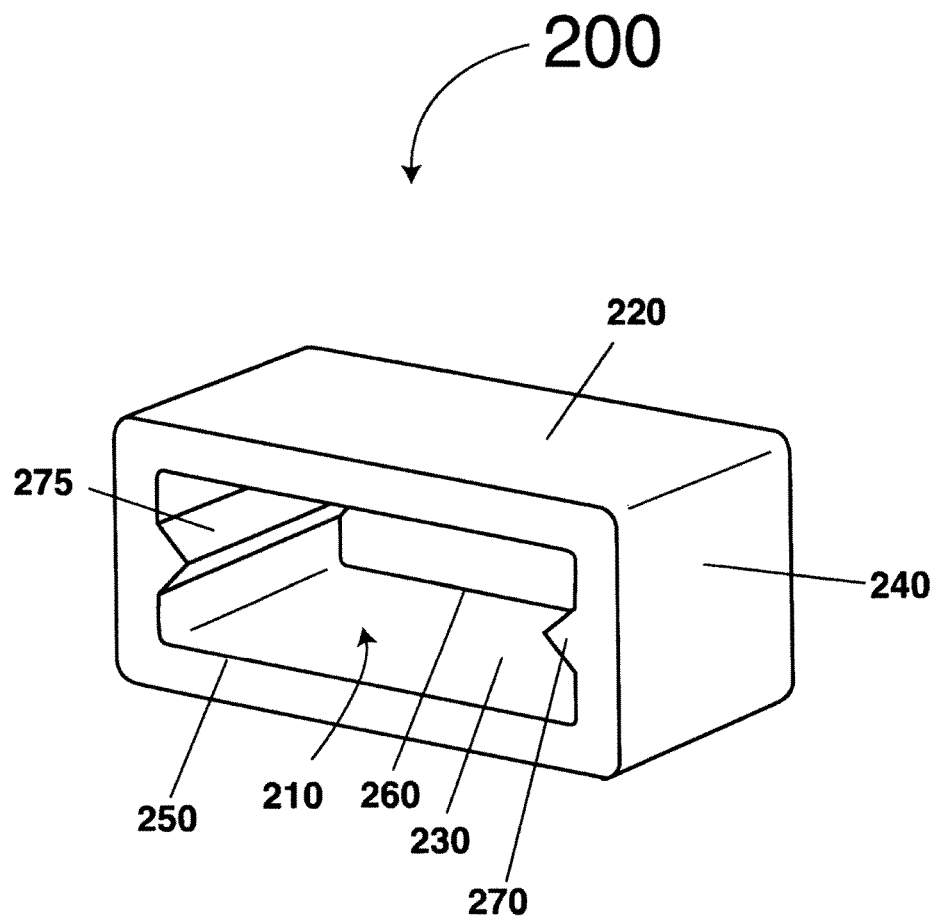
FIG. 6 illustrates an axonometric projection of a buckle of the reusable cable tie.
Figure 7:
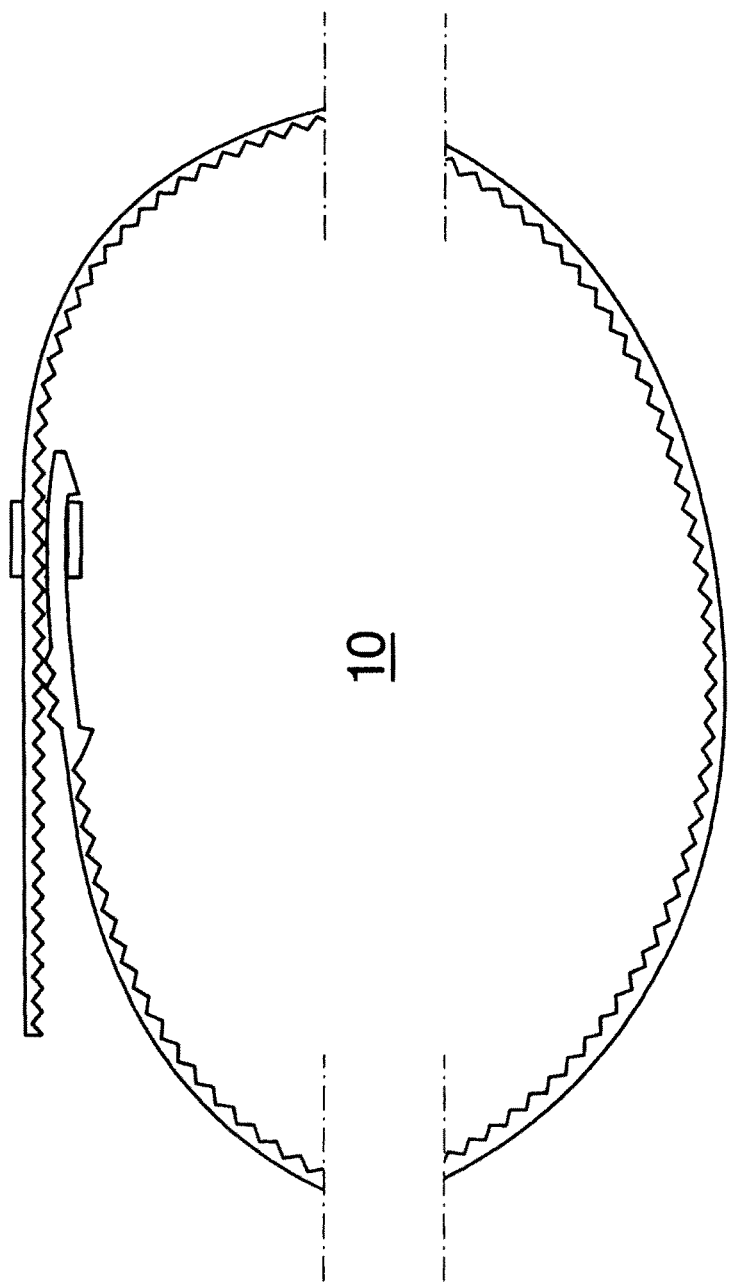
FIG. 7 illustrates a diagrammatic lateral view of a reusable cable tie during a wrapping of the elongated strap around an object.
Figure 8:
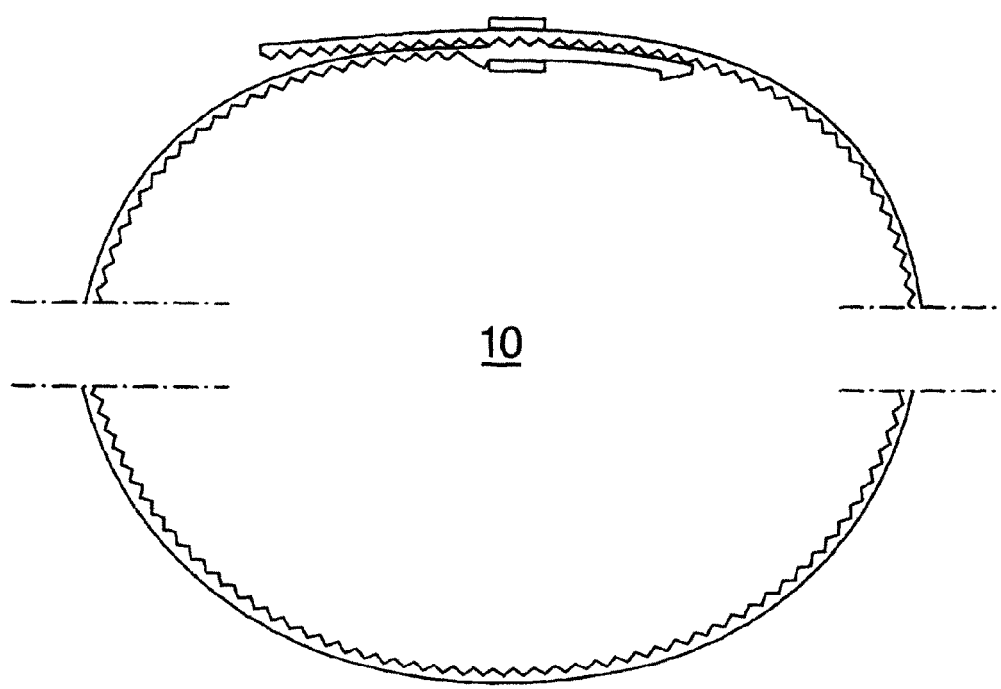
FIG. 8 illustrates a diagrammatic lateral view of a reusable cable tie in a final, closed position.
Figure 9:
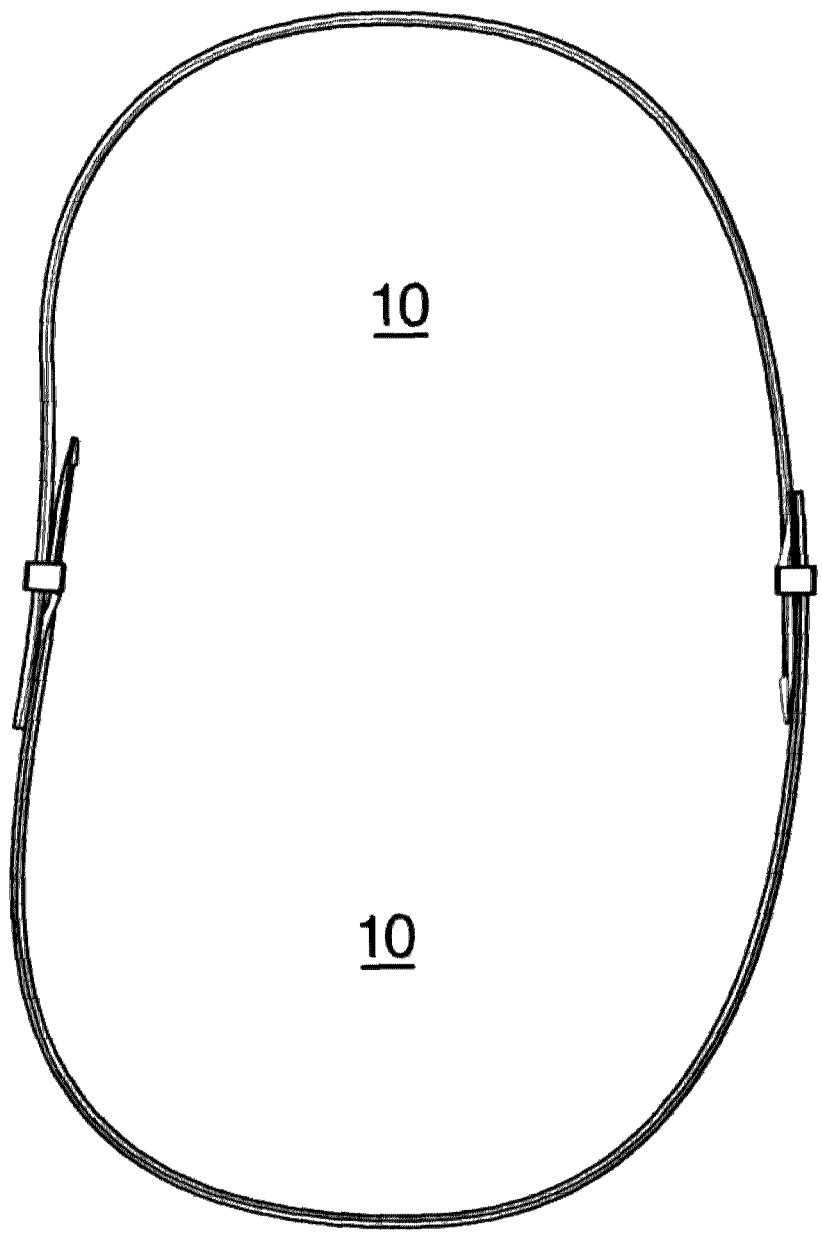
FIG. 9 illustrates a lateral view of two successive reusable cable ties, compounded together.

The accompanying drawings, as above described, illustrate a preferred embodiment of a "Reusable cable tie". This preferred embodiment is generally designed with numeral 10. Referring to FIGS. 1 to 9, in which like numerals indicate like elements, the reusable cable tie, already referenced as 10, includes an elongated strap 100, made of semi-rigid plastic material, and a buckle 200, made of rigid plastic material and used for interlocking with elongated strap 100.

Elongated strap 100 comprises a first end 105 and a second end 110, an inner side 115 and an outer side 120. Elongated strap 100 further comprises a rack 125 having a multiplicity of teeth 130, equally spaced and transversely located with respect to the direction of elongated strap 100. Each tooth of multiplicity of teeth 130 has in cross-section a triangular shape.

Multiplicity of teeth 130 alternates with a multiplicity of grooves 135. Each groove of multiplicity of grooves 135 has a shape and a size commensurate with each tooth of multiplicity of teeth 130. Multiplicity of teeth 130 extends from first end 105 up to a flat indented zone 140 incorporated into second end 110.

Outer side 120 is provided with several teeth 130' alternating with several grooves 135', the former and the latter being compatible to intermesh with a corresponding number of teeth and grooves of multiplicity of teeth 130 and multiplicity of grooves 135 and projecting from outer side 120 in an external zone 145 corresponding to a beginning of flat indented zone 140. Describing now in more detail, the following is added a) each tooth of multiplicity of teeth 130 of elongated strap 100 has in cross-section a triangular shape which is defined by an isosceles triangle; b) second end 110 of elongated strap 100, which incorporates flat indented zone 140, is provided with 1) an internal wedge 150 located between flat indented zone 140 and an end of multiplicity of teeth 130, internal edge 150 being tapered to a thin edge towards multiplicity of teeth 130; and 2) an external wedge 155 located at an external extremity of flat indented zone 140 and having its thick edge directed towards flat indented zone 140, while its thin edge is directed outwardly from elongated strap 100.

Elongated strap 100, laterally, at each side of multiplicity of teeth 134) and multiplicity of grooves 135, starting from bottoms of multiplicity of teeth 130 and multiplicity of grooves 135, is provided with an ascending slanted zone 160, followed by a flat zone 163, parallel to elongated strap 100, then by an externally directed, descending slanted zone 165 and, finally, terminates into a straight zone 170 perpendicular to elongated strap 100.

Flat indented zone 140 includes a short, slightly widened portion 175, preceded by a first retaining portion 180 starting from internal edge 150. First retaining portion 180, lengthwise has such a size that enables buckle 200 to be lodged there, when reusable cable tie 10 is in a final closed position. A second retaining portion 180' succeeds short, slightly widened portion 175 extending up to external edge 155.

Second retaining portion 180', lengthwise has such a size that enables buckle 200 to be lodged there during a wrapping of reusable cable tie 10 around an object. Short, slightly widened portion 175, being wider than first retaining portion 180 and second retaining portion 180' keeps buckle 200 in place either in first retaining portion 180 or in second retaining portion 180', no hand being necessary therefore. To move buckle 200 from first retaining portion 180 to second retaining portion 180' or vice verso, a slight manual effort to move buckle 200 along short, slightly widened portion 175 is needed.

Buckle 200 has a shape of a rectangular parallelepiped that incorporates a cavity 210 delimited by a top 220, a bottom 230 and lateral sides 240, an entrance 250 and an exit 260, the former and the latter being intended for the passage of first end 105 or second end 110 or both, when the former and the latter are superposed.

In order first to wrap and then to tighten elongated strap 100 around an object, buckle 200 is kept in retaining portion 180 of flat indented zone 140 and a portion of elongated strap 100 is located at a lower part of cavity 210, with its several teeth 130' projecting upwardly. After an adjustment of elongated strap 100 is completed, elongated strap 100 starting with first end 105 is inserted through cavity 210, above second end 110, and, finally, buckle 200 is so displaced that several teeth 130' penetrate corresponding grooves 135 of multiplicity of teeth 130.

A ridge engaging tooth 270 projecting out along cavity 210, at midway of each lateral sides 240, is provided with intersecting sides 275 for contacting descending slanted zones 165, so that buckle 200 enables a easy passage of elongated strap 100.

In a variant of the above embodiment (See FIG. 9), when a length of one elongated strap 100 does not suffice, two successive reusable cable ties 10 are compounded. When required, more than two successive reusable cable ties 10 are compounded.

As required, a detailed embodiment of the present invention is disclosed herein; however, it is to be understood that the disclosed embodiment is merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention.

The invention claimed is:

1. A reusable cable tie comprising:
an elongated strap, made of semi-rigid plastic material, and a buckle, made of rigid plastic material and intended for interlocking with said elongated strap, said elongated strap comprising:
a first end a second end;
an inner side and an outer side;
said inner side comprising a rack with a multiplicity of teeth, equally spaced and transversely located with respect to the direction of said elongated strap, each of said multiplicity of teeth having in cross-section a triangular shape, said multiplicity of teeth alternating with a multiplicity of grooves, equally spaced, each of said multiplicity of grooves having a shape and a size corresponding to each of said multiplicity of teeth;
said multiplicity of teeth extending from said first end up to a flat indented zone, incorporating into said second end;
said second end having several teeth, alternating with several grooves being compatible to intermesh with a corresponding number of teeth and grooves of said multiplicity of teeth and said multiplicity of grooves, said several teeth projecting from said outer side in an external zone corresponding to a beginning of said flat indented zone;
said buckle having a shape of a rectangular parallelepiped incorporating a cavity delimited by top, bottom and lateral sides, an entrance and an exit;
said cavity being so shaped and sized as to allow a passage through of said first or said second end of said elongated strap, or both when superposed; and, in order first to wrap and then to tighten said elongated strap around an object, said buckle is retained in said flat indented zone, at a lower part of said cavity, with its several teeth projecting upwardly; and after the tightening is completed, said first end of said elongated strap is inserted through said cavity, above said second end and, finally, said buckle is so displaced that said several teeth penetrate corresponding grooves of said multiplicity of grooves;
said triangular shape being defined by an isosceles triangle; said one end of said elongated strap, incorporating said flat indented zone, being provided
a) with an internal wedge located between said flat indented zone and an end of said multiplicity of teeth; said internal wedge being tapered to a thin edge towards said multiplicity of teeth, and
b) with an external wedge located at an external extremity of said flat indented zone, a thick edge of said external wedge being directed towards said flat intended zone, while a sharp edge of said external edge being directed outwardly;
said elongated strap being provided laterally, at each side of said multiplicity of teeth and said multiplicity of grooves, starting from their bottoms, with an ascending slanted zone, followed by a flat zone, parallel to said elongated strap, then by an externally directed, descending slanted zone and, finally, terminates into a straight zone, perpendicular to said elongated strap;
said flat indented zone including a short widened portion, preceded by a first retaining portion starting from said internal edge, said first retaining portion, lengthwise, having such a size that enables said buckle to be lodged there, when said reusable cable tie is in a final closed position;
a second retaining portion succeeding said short widened portion that extends up to said external wedge, said second retaining portion, lengthwise, having such a size that enables said buckle to be lodged there during a wrapping of said reusable cable tie around an object;
said short widened portion, being wider than said first retaining portion and said second retaining portion keeping said buckle in place either in said first retaining portion or in said second retaining portion, no hand being necessary therefore, to move said buckle from said first retaining portion to said second retaining portion or vice versa, a manual effort to move said buckle along said short widened portion being needed; and
a ridge engaging tooth, projecting out along said cavity at midway of each said lateral sides, including intersecting sides for contacting said descending slanted zones, so that said buckle enables a passage of said elongated strap.

* * * * *